Feb. 28, 1933.   C. F. HAMMOND, JR   1,899,271
SHOCK ABSORBER
Filed May 25, 1931   2 Sheets-Sheet 1
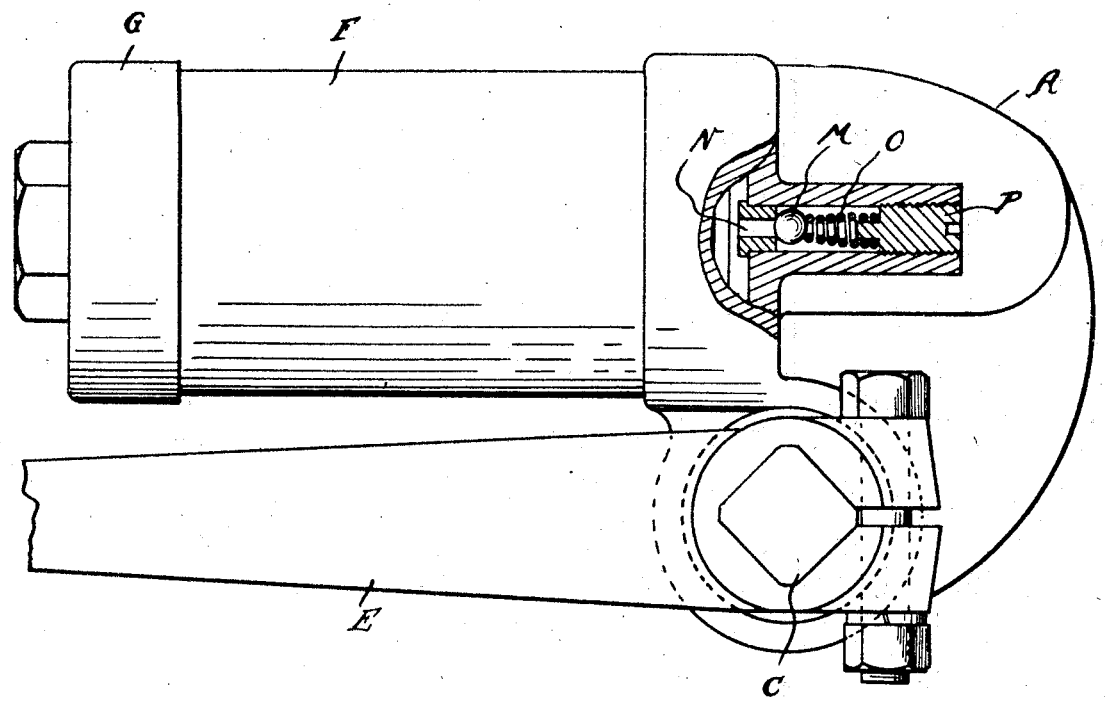
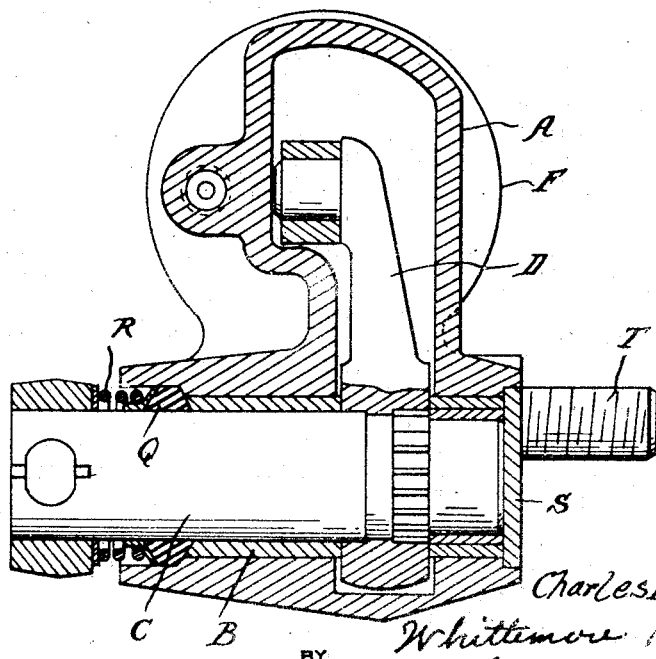
INVENTOR
Charles F. Hammond Jr
BY Whittemore Hulbert
Whittemore Belknap
ATTORNEYS

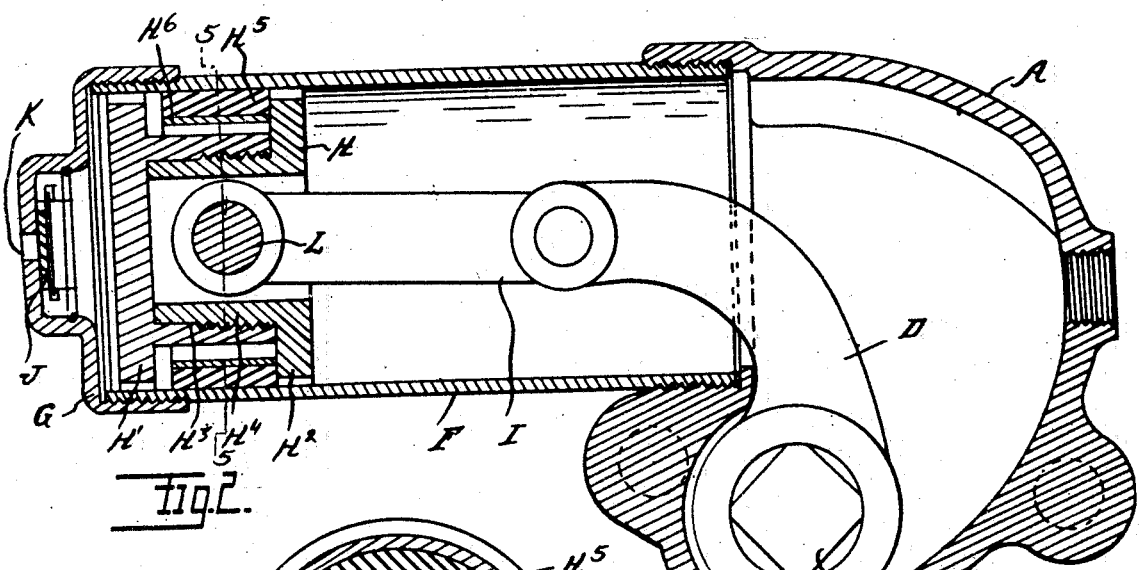
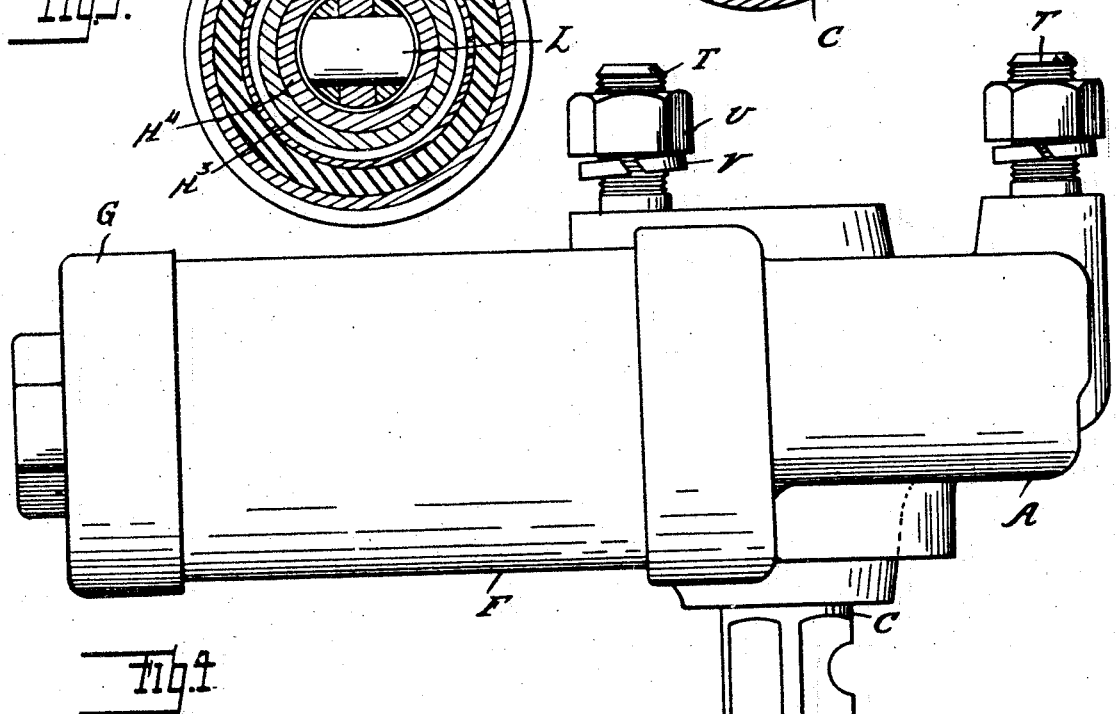
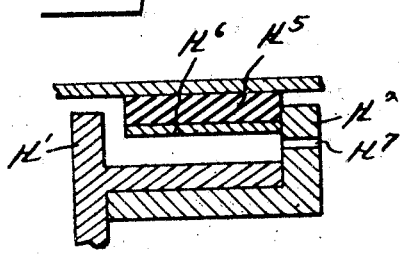

Patented Feb. 28, 1933

1,899,271

UNITED STATES PATENT OFFICE

CHARLES F. HAMMOND, JR., OF DETROIT, MICHIGAN, ASSIGNOR TO GEMMER MANUFACTURING COMPANY, OF DETROIT, MICHIGAN, A CORPORATION OF MICHIGAN

SHOCK ABSORBER

Application filed May 25, 1931. Serial No. 539,940.

This invention relates to shock absorbers of that type comprising a cylinder and piston and in which the resistant medium for opposing movement of the piston in the cylinder is compressed air. It is the object of the invention to obtain an improved construction which can be manufactured at low cost and which is highly efficient in operation, and to this end the invention consists in the construction as hereinafter set forth.

In the drawings:

Figure 1 is an elevation partly in section of my improved shock absorber;

Figure 2 is a longitudinal section therethrough;

Figure 3 is a cross section taken substantially in the plane of the axis of the rock shaft;

Figure 4 is a plan view;

Figure 5 is a cross section on line 5—5 of Figure 2;

Figure 6 is a section similar to a portion of Figure 2 showing a modification.

My improved construction comprises a housing A having formed therein a transversely extending journal bearing B for a rock shaft C having mounted thereon within the housing a rock arm D and external to the housing an actuating rock arm E. Secured to and projecting from the housing A is a cylinder F preferably having a threaded engagement with the housing and provided at its opposite end with a cap G having a threaded engagement therewith. Within the cylinder is a piston H which is connected by a link or rod I with the rock arm D, the arrangement being such that an angular movement of the actuating rock arm E will through the connecting mechanism cause a reciprocation of the piston within the cylinder.

The cap G has mounted therein a check valve J controlling a port K for connecting the interior of the cylinder with the external atmosphere and the arrangement is such that this check valve will automatically close when the piston is actuated towards the cap and will open when the piston is moved in a reverse direction. The construction of the piston is also such that under certain conditions a free passage of air is provided therethrough from one end of the cylinder to the other while under other conditions the piston forms an air seal, the construction being as follows:

The body of the piston as shown is formed of two members $H'$, $H^2$, having hollow shanks of reduced diameter $H^3$ and $H^4$ with a threaded engagement therebetween. Between the members $H'$ and $H^2$ is arranged a radially expansible packing ring $H^5$ which has a peripheral sealing engagement with the inner surface of the cylinder F and also a side sealing engagement alternatively with the members $H'$ $H^2$. The length of the ring $H^5$ is less than the distance between the inner faces of the members $H'$ $H^2$ so as to permit free communication between the space at one end of the cylinder and the space within the piston and on the inner face of the ring. Thus the friction of the expansible ring $H^5$ against the cylinder wall will always be proportional to the pressure of the air which is being compressed by movement of the piston. The ring $H^5$ may be made of any suitable expansible material such as rubber and to provide a minimum radial pressure against the cylinder wall there is preferably provided a metallic expander ring $H^6$ arranged within the ring $H^5$. This has the double effect first of insuring an effective peripheral seal and second, of frictionally resisting movement of the piston in proportion to the air pressure it is moving against. The piston H is connected to the rod I through the medium of a wrist pin L extending transversely of the hollow shank H.

With the construction as thus far described the operation is as follows: Whenever the arm E is rocked this through the rock shaft C, arm D and rod I will communicate motion to the members $H'$ and $H^2$ but will not directly actuate the ring $H^5$ because of the lost motion between the same and said members $H'$ and $H^2$. As soon, however, as the lost motion is taken up then the ring $H^5$ will also be actuated to be moved within the cylinder F in a direction towards the housing A. During such movement of the piston the check valve J will open to permit air to enter through the port K into the cylinder to maintain substantially atmospheric pressure therein in rear of the piston. The air in advance of the piston is, however, compressed by reason of the fact that the flange of the member H' is in sealing contact with the end of the ring H⁵ while said ring is in sealing contact with the cylinder wall. Thus the pressure will be increased in proportion to the displacement and this pressure will extend into the space between the members H' and H² and act radially outward upon the ring H⁵. In the reverse movement of the arm E the piston will be moved towards the opposite end of the cylinder but during the initial movement of the members H' H² the seal between the members H' and the ring H⁵ will be broken which will permit the compressed air in the housing A to pass the piston and equalize with the pressure in the opposite end of the cylinder. This increase of pressure will also close the check valve J so as to prevent loss through the port K. Consequently during the return movement of the piston the air will be further compressed and this action will continue in successive cycles, each of which will draw in an additional quantity of air at atmospheric pressure on the forward stroke of the piston and will increase the pressure of the total quantity of air during the return stroke.

If the operation just described were permitted to continue indefinitely the pressure within the cylinder might mount to a dangerous degree. This effect is prevented by a relief valve which is connected to the chamber in the housing A and is set to open whenever the pressure exceeds a predetermined limit. Preferably this relief valve is located in the housing A at one side of the chamber in which the crank arm D moves. As shown in Figure 1, a ball valve M is seated to close a port N communicating with the cylinder and to open outwardly therefrom. A spring O normally holds the valve to its seat and the tension of this spring may be varied and set for any predetermined pressure by an adjustable screw plug P.

As the housing A must hold air at more than atmospheric pressure it is necessary to seal the journal bearing for the shaft C which passes out from said housing. This may be accomplished by arranging a packing gland Q at the outer end of the bearing with a spring R between the same and the arm E to maintain a constant pressure on said gland so as to hold the same in sealing contact with the journal bearing. The opposite end of the shaft C does not extend out from the housing A but for convenience in manufacturing the housing A is first bored completely through to permit of the insertion of bushings constituting the bearing B. One end of this bore is then closed by an expansible plug S which forms an air seal.

For mounting on the chassis of a motor vehicle, the housing A is preferably provided with studs or clamping bolts T projecting therefrom, these being threaded to receive the nuts U and lock washers V. Thus the cylinder F may be rigidly mounted on the frame of the chassis and the arm E connected in any suitable manner with the axle or other relatively moving part.

A very important feature of my improvement is the means employed for maintaining the air seal of the piston during the greater part of the stroke thereof in either direction while permitting a free flow of air past the piston during initial movement in either direction. This consists essentially in the packing ring H⁵ and the cooperating members H' H². The ring is always subjected to a radial outward pressure equal to the pressure of the air within the cylinder and this has the double effect of first maintaining the peripheral seal and second, increasing frictional resistance between the ring and the cylinder wall in proportion to the air pressure. As a consequence, the ring H⁵ can not be displaced by air pressure alone but must be mechanically actuated. This fact that the ring will not move by air pressure insures the opening of an air passage from one side of the piston to the other during the time interval when the members H' H² are moved to take up lost motion between the same and the ring. As this is at the beginning of a substantially harmonic movement the velocity will be relatively low so that sufficient time will elapse to insure full equalization of the air pressures on opposite sides of the piston before the piston again seals with the ring H⁵.

With the modified construction shown in Figure 6 the flange H² is provided with a calibrated port H⁷ which permits passage of air therethrough when the flange H² is in sealing contact with the ring H⁵. This will permit equalization of pressures on opposite sides of the piston whenever said piston is traveling towards the capped end of the cylinder but will not interfere with the sealing effected by the flange H' against the ring H⁵ when the piston is traveling in the opposite direction. This in effect is to make the shock absorber single acting instead of double acting which is advantageous under certain conditions of use. However, for other uses the double acting construction is preferable.

What I claim as my invention is:

1. In a shock absorber, the combination with a cylinder, of a piston therein having a body portion and an annular sealing portion with a lost motion connection therebetween, said annular sealing portion having a frictional engagement with the wall of the cylinder to hold the same from movement by differential air pressure on the opposite ends thereof, and also having a sealing engagement with said body portion alternatively at its opposite ends and an actuating connection for reciprocating the body portion of said piston whereby on reversal of direction of movement the seal between the same and said annular portion is broken to permit equalization of pressures on opposite sides thereof.

2. In a shock absorber, the combination with a cylinder, of a piston therein comprising a peripherally grooved body portion and an annular sealing portion in said groove and of lesser width to provide lost motion between the same and the opposite sides of the groove, said annular portion having a peripheral sealing engagement with the wall of the cylinder and being subjected on its inner side to the compression pressure within the cylinder to maintain a high frictional resistance against movement in the cylinder, and the opposite sides of said annular portion being adapted to alternatively seal with the opposite sides of the groove in the body, a check valve for admitting successive volumes of air to said cylinder upon the reciprocation of the piston therein and means connected to the body portion of said piston for actuating the same and indirectly actuating said annular member whereby on reversal of movement the seal between said body portion and said annular portion is broken permitting equalization of air pressure on opposite sides of said piston.

3. In a shock absorber, the combination with a cylinder, of a piston therein comprising a grooved portion and an annular member in said groove of lesser width having a peripheral sealing engagement with the wall of the cylinder and an alternative sealing engagement at its opposite sides with the oppogagement sides of the groove, means for actuating the body portion of said piston in said cylinder to reciprocate the same with a limited clearance at one end of its stroke and a check valve for admitting successive volumes of air to the cylinder at the limited clearance end whereby said admitted volumes are successively compressed and upon reversal of the piston the pressures are equalized on opposite sides thereof, the pressure on the high pressure side before reversal of the piston acting upon the inner surface of said annular member to frictionally hold the same against any movement in the cylinder independent of that by actuation by said body portion.

4. In a shock absorber, the combination with a cylinder, of a piston therein comprising a body portion and an annular member having a lost motion engagement with said body portion and a peripheral sealing engagement with the wall of the cylinder, the opposite sides of said annular member being adapted to alternatively seal with said body portion when the lost motion is taken up, a cap for closing one end of said cylinder, a check valve controlling a port in said cap for admitting successive volumes of air to said cylinder, a housing connected to the opposite end of said cylinder, a rock arm in said housing, a connecting rod between said rock arm and the body portion of said piston, a rock shaft for actuating said rock arm journaled in said housing and extending out therefrom, air sealing means between said rock shaft and its bearing and a pressure relief valve connected with said housing to limit the pressure attained by the compression of successive admitted volumes of air, the lost motion connection between said piston body and annular member permitting equalization of air pressures on opposite sides thereof upon each reversal in direction of movement.

5. In a shock absorber, the combination with a cylinder, of a piston therein, a radially expansible sealing ring for said piston having peripheral contact with the piston wall, means for exposing the inner face of said ring to the pressure in the cylinder against which the piston is moving whereby the frictional resistance to movement of said ring in the cylinder is proportional to said pressure, and means operated by the frictional resistance of said ring when the movement of the piston is reversed for opening an equalizing passage through said piston between opposite ends of the cylinder.

In testimony whereof I affix my signature.

CHARLES F. HAMMOND, Jr.